United States Patent
Koga et al.

(10) Patent No.: US 9,842,694 B2
(45) Date of Patent: Dec. 12, 2017

(54) MULTILAYER CERAMIC ELECTRONIC COMPONENT

(71) Applicant: Murata Manufacturing Co., Ltd., Nagaokakyo-shi, Kyoto-fu (JP)

(72) Inventors: Seiji Koga, Nagaokakyo (JP); Tomochika Miyazaki, Nagaokakyo (JP)

(73) Assignee: MURATA MANUFACTURING CO., LTD., Nagaokakyo-shi, Kyoto-fu (JP)

( * ) Notice: Subject to any disclaimer, the term of this patent is extended or adjusted under 35 U.S.C. 154(b) by 31 days.

(21) Appl. No.: 15/058,369

(22) Filed: Mar. 2, 2016

(65) Prior Publication Data

US 2016/0181016 A1 Jun. 23, 2016

Related U.S. Application Data

(63) Continuation of application No. PCT/JP2014/072596, filed on Aug. 28, 2014.

(30) Foreign Application Priority Data

Sep. 27, 2013 (JP) ................... 2013-201644

(51) Int. Cl.
*H01G 4/12* (2006.01)
*H01G 4/30* (2006.01)
(Continued)

(52) U.S. Cl.
CPC ............ *H01G 4/1209* (2013.01); *C09D 5/24* (2013.01); *H01G 4/012* (2013.01);
(Continued)

(58) Field of Classification Search
CPC .... H01G 4/1209; H01G 4/012; H01G 4/1227; H01G 4/224; H01G 4/232; H01G 4/2325; H01G 4/30; C09D 5/24
See application file for complete search history.

(56) References Cited

U.S. PATENT DOCUMENTS 6,982,864 B1 1/2006 Sridharan et al.
2004/0144962 A1 7/2004 Hayakawa et al.
(Continued)

FOREIGN PATENT DOCUMENTS

CN 1965381 A 5/2007
CN 105144323 A 12/2015
(Continued)

OTHER PUBLICATIONS

International Search Report for PCT/JP2014/072596 dated Nov. 25, 2014.
Written Opinion for PCT/JP2014/072596 dated Nov. 25, 2014.

*Primary Examiner* — Dion R Ferguson
(74) *Attorney, Agent, or Firm* — Arent Fox LLP

(57) ABSTRACT

A multilayer ceramic electronic component in which an interface of an edge region of an external electrode that extends around to a side surface of a ceramic body and the ceramic of the surface of the ceramic body in contact therewith, there exists glass (a) containing BaO serving as a first alkaline earth oxide and at least one of CaO and SrO serving as a second alkaline earth oxide, (b) having a total content ratio of the first alkaline earth oxide and the second alkaline earth oxide in a range of 30 to 70 mol %, and (c) having an $SiO_2$ content ratio in a range of 15 to 60 mol %. The molar ratio of the first alkaline earth oxide to the second alkaline earth oxide is in a range of 0.1 to 0.5.

11 Claims, 5 Drawing Sheets

(51) Int. Cl.
*H01G 4/232* (2006.01)
*C09D 5/24* (2006.01)
*H01G 4/012* (2006.01)
*H01G 4/224* (2006.01)

(52) U.S. Cl.
CPC .......... *H01G 4/1227* (2013.01); *H01G 4/224* (2013.01); *H01G 4/232* (2013.01); *H01G 4/2325* (2013.01); *H01G 4/30* (2013.01)

(56) References Cited

U.S. PATENT DOCUMENTS

| | | |
|---|---|---|
| 2005/0276002 A1 | 12/2005 | Sridharan et al. |
| 2013/0250480 A1* | 9/2013 | Ahn ...................... H01G 4/129 361/321.2 |
| 2014/0233147 A1* | 8/2014 | Hong .................... H01G 4/008 361/301.4 |
| 2016/0042867 A1 | 2/2016 | Kisumi |

FOREIGN PATENT DOCUMENTS

| | | |
|---|---|---|
| JP | 2003077336 A | 3/2003 |
| JP | 2004228075 A | 8/2004 |
| JP | 2005-228904 A | 8/2005 |
| JP | 2008-503103 A | 1/2008 |
| JP | 2010257937 A | 11/2010 |
| JP | 2012-230959 A | 11/2012 |

* cited by examiner

MULTILAYER CERAMIC ELECTRONIC COMPONENT

CROSS REFERENCE TO RELATED APPLICATIONS

The present application is a continuation of International application No. PCT/JP2014/072596, filed Aug. 28, 2014, which claims priority to Japanese Patent Application No. 2013-201644, filed Sep. 27, 2013, the entire contents of each of which are incorporated herein by reference.

FIELD OF THE INVENTION

The present invention relates to a multilayer ceramic electronic component, and more specifically to a multilayer ceramic electronic component comprising a ceramic body having a structure having internal electrodes stacked in layers with a ceramic layer interposed and an external electrode disposed in a manner to extend from an end surface of the ceramic body around to a side surface of the ceramic body.

BACKGROUND OF THE INVENTION

One representative ceramic electronic component is a multilayer ceramic capacitor having a structure as shown in FIG. 5 for example.

This multilayer ceramic capacitor is, as shown in FIG. 5, structured such that a stack of ceramic layers (a ceramic body) 60 having a plurality of internal electrodes 52 (52a, 52b) stacked in layers with a ceramic layer 51 that is a dielectric layer interposed has opposite end surfaces 53a and 53b provided with an external electrode 54 (54a, 54b) electrically connected to internal electrode 52 (52a, 52b).

When such a multilayer ceramic capacitor is produced, external electrode 54 (54a, 54b) is formed generally by a method of applying and firing a conductive paste on the opposite end surfaces of the stack of ceramic layers (or the ceramic body).

As such a conductive paste used to form the external electrode, there has been proposed a conductive paste for example containing at least metallic powder and a BaO—SrO—ZnO—$B_2O_3$—$SiO_2$-based glass frit, the glass frit, as converted into oxide, containing 10-50% by weight of BaO, 5-40% by weight of SrO, 10-30% by weight of ZnO, 15-30% by weight of $B_2O_3$ and 3-20% by weight of $SiO_2$, with 0.5-10% by weight of the glass frit contained relative to 100% by weight of the metallic powder (see PTD 1).

It is said that the external electrode formed of this conductive paste has the glass frit less easily permeating through the ceramic that configures the stack of ceramic layers when fired. It is believed that this is because the glass frit used in the conductive paste of PTD 1 has a large content of BaO and SrO and is thus less reactive to the ceramic body.

Furthermore, as another conductive paste, a conductive paste has been proposed that contains at least one conductive powder selected from copper powder, nickel powder, copper-nickel-alloys powder and their mixture, and a glass frit free of lead, bismuth and cadmium and having a softening point of 530 to 650° C. and a coefficient of thermal expansion of 9.0 to 11.5 ppm/° C. with the conductive powder and glass frit dispersed in an organic medium (see PTD 2).

And it is said that the conductive paste of PTD 2 can provide an external electrode having high density and presenting excellent adhesion to the ceramic body.

However, the conductive paste of PTD 1 has a small amount of $SiO_2$ used in the glass frit, and accordingly, the glass contained in the external electrode formed using the conductive paste of PTD 1 is easily dissolved in a plating liquid and in the step of plating the external electrode the plating liquid infiltrates into the external electrode, the ceramic body and the like, resulting in the multilayer ceramic electronic component having disadvantageously reduced mechanical strength.

Furthermore, the conductive paste of PTD 2 also has a problem similar to the above problem described for the conductive paste of PTD 1.

PTD 1: Japanese Patent Laying-Open No. 2003-077336
PTD 2: Japanese Patent Laying-Open No. 2004-228075

SUMMARY OF THE INVENTION

The present invention solves the above problem and it contemplates a highly reliable multilayer ceramic electronic component capable of preventing reduced mechanical strength caused as a plating liquid used to plate an external electrode otherwise infiltrates into the external electrode, a ceramic body and the like.

In order to solve the above problem, the present invention provides a multilayer ceramic electronic component comprising: a ceramic body having a structure in which a plurality of internal electrodes are stacked in layers with a ceramic layer interposed; and an external electrode electrically connected to the internal electrodes, and formed at an end of the ceramic body and extending around from an end surface to a side surface of the ceramic body, at an interface of an edge region of an extending-around portion of the external electrode that extends around to the side surface of the ceramic body and ceramic configuring a surface of the ceramic body, there being glass (a) containing BaO serving as a first alkaline earth oxide and at least one of CaO and SrO serving as a second alkaline earth oxide, (b) having a total content ratio of the first alkaline earth oxide and the second alkaline earth oxide in a range of 30 to 70 mol %, and (c) having an $SiO_2$ content ratio in a range of 15 to 60 mol %.

Furthermore, in the multilayer ceramic electronic component of the present invention, preferably the ratio of the first alkaline earth oxide to the second alkaline earth oxide is in a range of 0.1≤(the first alkaline earth oxide/the second alkaline earth oxide)≤0.5 (in molar ratio).

The ratio of the first alkaline earth oxide to the second alkaline earth oxide in the range of 0.1≤(the first alkaline earth oxide/the second alkaline earth oxide)≤0.5 (in molar ratio) further ensures that a reactivity between the glass in the external electrode formed by applying and baking a conductive paste and the ceramic configuring the ceramic body can be suppressed and the crystallization of the glass in the external electrode that results after firing can also be suppressed to reduce solubility in the plating liquid and enhance resistance against plating to thus allow the present invention to be more effective.

Furthermore, preferably the external electrode has a surface having a plating film layer thereon.

A multilayer ceramic electronic component including an external electrode having a surface provided with a plating film layer thereon will be fabricated through a plating step, and as the multilayer ceramic electronic component of the present invention includes the above configuration and has glass of a composition of the above described range at an interface of an edge region of an extending-around portion of the external electrode that extends around to a side surface of the ceramic body (i.e., a region experiencing stress and thus easily serving as a point allowing cracking or the like to start therefrom) and the ceramic configuring the surface of the ceramic body, it can have the glass to be less dissolvable in the plating liquid and can suppress reduced mechanical strength caused by the plating liquid otherwise infiltrating into the external electrode, the ceramic body and the like, and can thus be a highly reliable multilayer ceramic electronic component.

Furthermore, in the multilayer ceramic electronic component of the present invention, preferably the edge region is a region within 10 μm from an edge of the extending-around portion of the external electrode that extends around to the side surface of the ceramic body.

The edge region that is a region within 10 μm from an edge of the extending-around portion of the external electrode as described above ensures the present invention's effect and allows the present invention to be more effective.

The multilayer ceramic electronic component of the present invention is configured as described above, and at an interface of an edge region of an extending-around portion of the external electrode that extends around to the side surface of the ceramic body and the ceramic configuring a surface of the ceramic body, there exists glass (a) containing a first alkaline earth oxide (BaO) and a second alkaline earth oxide (at least one of CaO and SrO), (b) having a total content ratio of the first alkaline earth oxide and the second alkaline earth oxide in a range of 30 to 70 mol %, and (c) having an $SiO_2$ content ratio in a range of 15 to 60 mol %, so that and when the external electrode is formed by a method of applying and baking a conductive paste a reaction between the glass in the external electrode and the ceramic configuring the ceramic body can be suppressed and crystallization of the glass configuring the external electrode can also be suppressed to reduce solubility into the plating liquid and enhance resistance against plating.

In other words, in the multilayer ceramic electronic component of the present invention, at an interface of an edge region of an extending-around portion of the external electrode and the ceramic configuring a surface of the ceramic body, glass which does not dissolve in the plating liquid segregates and thus suppresses infiltration of the plating liquid into the ceramic body, and thus enhances resistance against plating. Accordingly, the multilayer ceramic electronic component can be produced through the step of plating a surface of the external electrode without inviting reduced mechanical strength attributed to the plating liquid otherwise infiltrating into the ceramic body, and a highly reliable multilayer ceramic electronic component can thus be provided.

Note that in the present invention, as the ceramic layer configuring the ceramic body, a ceramic layer containing a $BaTiO_3$-based ceramic as a major component has a significance in particular.

More specifically, a multilayer ceramic capacitor is widely used as a multilayer ceramic electronic component including a ceramic layer containing a $BaTiO_3$-based ceramic as a major component, and applying the present invention to a multilayer ceramic electronic component such as the multilayer ceramic capacitor allows a highly reliable multilayer ceramic electronic component to be obtained and is thus more significant.

Furthermore, in the present invention, a base metal material is preferably used as an electrical conducting material configuring the external electrode.

In other words, in the multilayer ceramic electronic component of the present invention, a base metal material can be used as an electrical conducting material configuring the external electrode, and in that case, a highly reliable and excellently economical multilayer ceramic electronic component can be provided.

DETAILED DESCRIPTION OF THE PREFERRED EMBODIMENTS

An embodiment of the present invention will be indicated below to more specifically describe what characterizes the present invention.

Embodiment

Figure 1:
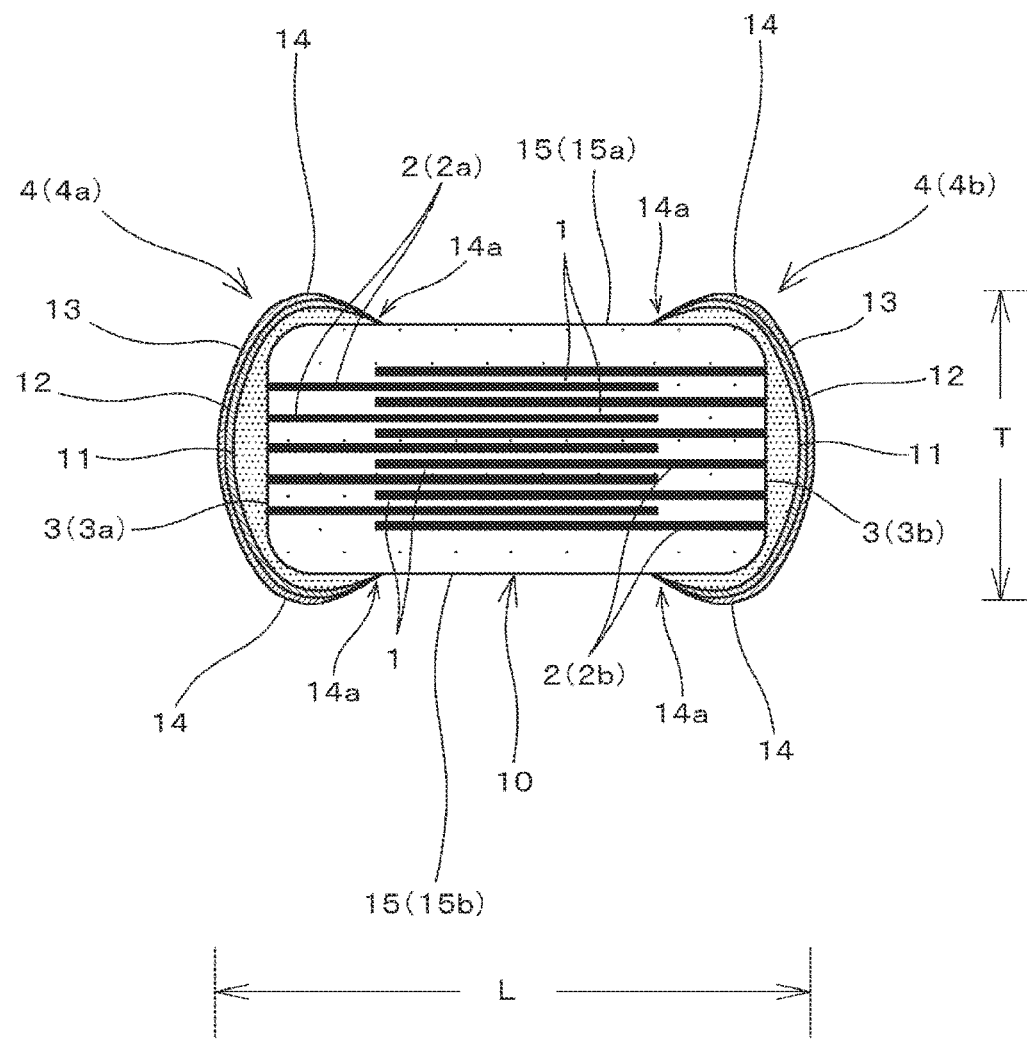
FIG. 1 is a front cross section showing a configuration of a multilayer ceramic capacitor according to an embodiment of the present invention.
Figure 2:
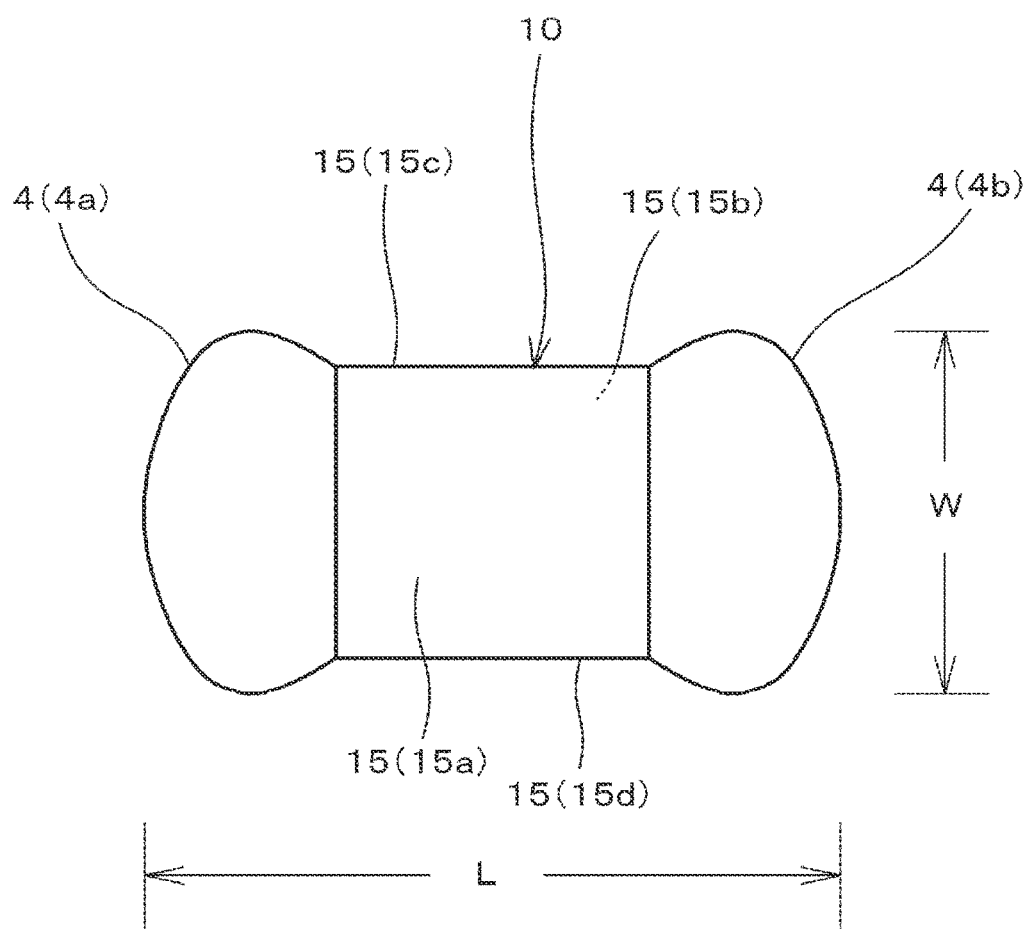
FIG. 2 is a plan view of the multilayer ceramic capacitor shown in FIG. 1.

This embodiment is an example of a multilayer ceramic capacitor having a structure as shown in FIGS. 1 and 2.

This multilayer ceramic capacitor, as shown in FIGS. 1 and 2, is structured such that a ceramic body (a multilayer ceramic capacitor element) 10 having a plurality of internal electrodes 2 (2a, 2b) stacked in layers with a ceramic layer 1 that is a dielectric layer interposed therebetween has opposite end surfaces 3 (3a, 3b) with an external electrode 4 (4a, 4b) disposed thereon such that it is electrically connected to internal electrodes 2 (2a, 2b).

Note that external electrode 4 (4a, 4b) is disposed to extend from opposite end surfaces 3 (3a, 3b) of ceramic body 10 around and thus beyond a ridge portion to four side surfaces 15 (15a, 15b, 15c, 15d) of the ceramic body.

External electrode 4 (4a, 4b), has a multilayer structure including an external electrode body 11 formed of a baked conductive paste, a Ni plating film layer 12 formed on a surface of external electrode body 11, and a Sn plating film layer 13 formed on a surface of Ni plating film layer 12.

Next, a method for fabricating this multilayer ceramic electronic component (or multilayer ceramic capacitor) will be described.

[1] Fabrication of Ceramic Body (1) A prescribed number of ceramic green sheets each formed using a $BaTiO_3$-based ceramic containing Ba and Ti as a major component were stacked in layers to form an outer layer portion to have a prescribed thickness after being fired, or a lower outer layer portion.

(2) On the lower outer layer portion formed in the step (1), a prescribed number of electrode pattern formed ceramic green sheets were stacked in layers, each sheet being the same ceramic green sheet as the ceramic green sheet used in the step (1), with an internal electrode paste containing Ni as a major component applied on the sheet by screen printing.

(3) On the electrode pattern formed ceramic green sheets stacked in layers in the step (2), a prescribed number of ceramic green sheets used in the step (1) were stacked in layers to form an outer layer portion to have a prescribed thickness after being fired (i.e., to form an upper outer layer portion) to thus form an unfired multilayer block.

(4) The unfired multilayer block fabricated in the step (3) was cut at a prescribed position to obtain an unfired ceramic body.

(5) The unfired ceramic body obtained in the step (4) was fired in a reducing atmosphere using a batch furnace to obtain a fired ceramic body prior to formation of the external electrode.

Note that this ceramic body is a rectangular parallelepiped having dimensions of a length (L): 1.0 mm, a width (W): 0.5 mm, and a thickness (T): 0.5 mm.

[2] Production of External Electrode Forming Conductive Paste

As a conductive paste used to form the external electrode, an external electrode forming conductive paste was produced by blending (1) Cu powder, (2) a glass frit, (3) a varnish, and (4) a solvent, as follows:

(1) Cu Powder (Electrically Conducting Component)

As an electrically conducting component configuring the conductive paste, Cu powder having an average particle diameter (D50) of 0.5 to 5 μm was prepared.

(2) Glass Frit

As a glass frit (a glass component) configuring the conductive paste, a glass frit was prepared that contained (a) $SiO_2$ accounting for 15 to 60 mol %, and (b) a first alkaline earth oxide (BaO) and a second alkaline earth oxide (at least one of CaO and SrO) having a total content ratio accounting for 30 to 70 mol %.

Note that the content ratio of $SiO_2$ configuring the glass frit was set to 15 mol % or more in order to ensure that the glass has resistance against the plating liquid.

Furthermore, the total content ratio of the first alkaline earth oxide (BaO) and second alkaline earth oxide (at least one of CaO and SrO) configuring the glass frit was set to 30 mol % or more in order to suppress a reaction between the glass contained in the external electrode and the ceramic configuring the ceramic body.

Note that the glass's softening point was controlled mainly by adjusting the amount of an alkali oxide added.

Furthermore, the amount of the glass was set such that the conductive paste had a solid content (i.e., the electrically conducting component+the glass frit) with the glass frit accounting for a proportion falling within a range of 18 to 22 vol % to ensure the external electrode's density and strength of adhesion to the ceramic body.

(3) Varnish

Acryl was dissolved in an organic solvent containing terpineol as a major component to provide a varnish.

(4) Solvent

As a solvent, a solvent containing terpineol as a major component was used.

The above electrically conducting component, glass frit, varnish, and solvent were weighed to have a predetermined amount and dispersed with a three-roller milling machine and thus mixed together to produce an external electrode forming conductive paste.

[3] Formation of External Electrode (1) In forming the external electrode, initially, the conductive paste produced as described above was applied to the ceramic body by immersing the ceramic body in the conductive paste. For example, the external electrode forming conductive paste was applied to a horizontal table by a prescribed thickness, and from thereabove, one end surface side of the ceramic body held with a holding jig was immersed in the paste to thus apply the external electrode paste to the end surface of the ceramic body and a region extending from the end surface around to a side surface of the ceramic body.

After the applied conductive paste was dried, the other end surface side of the ceramic body was similarly immersed to thus apply the conductive paste to the other end surface of the ceramic body and a region extending from the end surface around to a side surface of the ceramic body.

(2) In order to fire the external electrode forming conductive paste applied on the ceramic body, the ceramic body underwent a heat treatment using a belt furnace.

The thermal treatment was performed in a temperature profile holding a maximum temperature (800 to 950° C.) for 5 minutes to form a Cu baked electrode (the external electrode body) on the opposite ends of the ceramic body.

Note that in the process of the heat treatment, in order to suppress oxidation of the external electrode, a carrier gas of $N_2$ was used and, at the maximum temperature, $H_2$ was added to the carrier gas ($N_2$) to provide an adjusted atmosphere to provide electromotive force=600 to 900 mV to thus perform firing.

(3) Plating

The formed external electrode body was plated with Ni by wet electrolytic plating to form a Ni plating film on a surface of the external electrode, and furthermore, wet electrolytic plating was employed to perform Sn plating to form a Sn plating film on the Ni plating film.

The multilayer ceramic capacitor having the configuration as shown in FIGS. 1 and 2 was thus obtained.

[4] Assessment

The multilayer ceramic capacitor fabricated as described above was assessed in the method described below.

(1) Analysis of the Composition of the Glass that is Present at an Interface of an Edge Region of an Extending-Around Portion of the External Electrode.

Regarding the multilayer ceramic capacitor fabricated as described above, the composition of the glass that is present at an interface between an edge region 14a of an extending-around portion 14 of external electrode 4 that extends around to a side surface 15 of ceramic body 10 (hereinafter also referred to as "the extending-around portion's edge region") and the ceramic configuring the surface of ceramic body 10 (hereinafter also referred to as "the interface of the external electrode's edge region and the ceramic body"), was examined in the following method.

Note that, in this embodiment, with reference to FIGS. 1 and 2, a region within 10 μm from an edge of extending-around portion 14 of external electrode 4 was set as the "extending-around portion's edge region."

Initially, the multilayer ceramic capacitor shown in FIGS. 1 and 2 was ground from an LT plane defined by a length L and a thickness T to have a dimension in the direction of a width W to be ½, and thereafter, each sample was observed at any one location of the interface of the external electrode's edge region and the ceramic body with a transmission electron microscope (TEM) at a magnification of 100,000 to 200,000 times. Note that 20 samples (n=20) underwent this observation.

Furthermore, the location of the "interface of the external electrode's edge region and the ceramic body" of each sample that underwent the TEM observation underwent a mapping analysis for Si, Ba, Sr, Ca at a magnification of 100,000 to 200,000 times to distinguish the glass segregated at the interface of the external electrode's edge region and the ceramic body, and the ceramic body.

The glass segregated at the interface of the external electrode's edge region and the ceramic body underwent a qualitative analysis and a semiquantitative analysis. 20 samples were subjected thereto and analyzed by point analysis.

(2) Assessment of Solubility of the Glass Segregated at the Interface of the External Electrode's Edge Region and the Ceramic Body Relative to the Plating Liquid The multilayer ceramic capacitor thus fabricated was ground from the LT plane to have a dimension in the direction of width W to be ½.

The ground and thus exposed surface was immersed in a Ni plating liquid of 60° C. for 2 hours and in a Sn plating liquid of 25° C. for 1 hour and the extending-around portion's edge region before and after the immersion was observed with a field emission scanning electron microscope (FE-SEM) (at a measurement magnification of 10,000 times).

Crystallized glass's solubility relative to the plating liquid was confirmed from a change between the FE-SEM images obtained before and after the immersion in the plating liquids.

(3) Assessment of Reactivity Between the Glass in the External Electrode and the Ceramic Body The multilayer ceramic capacitor thus fabricated was ground from the LT plane to have a dimension in the direction of width W to be ½, and thereafter, each sample was observed at any one location of the extending-around portion's edge region with a transmission electron microscope (TEM) at a magnification of 100,000 to 200,000 times.

And the observed portion was subjected to a line analysis regarding silicon (Si) in the direction of the thickness of a reaction layer. From a result of the line analysis, a concentration gradient was measured and an average value of n=5 was determined as the reaction layer's thickness.

And any sample having the thus obtained reaction layer with a thickness less than 0.5 μm was determined as "unreacted."

amount of silicon (Si) detected and the thickness of the reaction layer, and the like.

Figure 3:
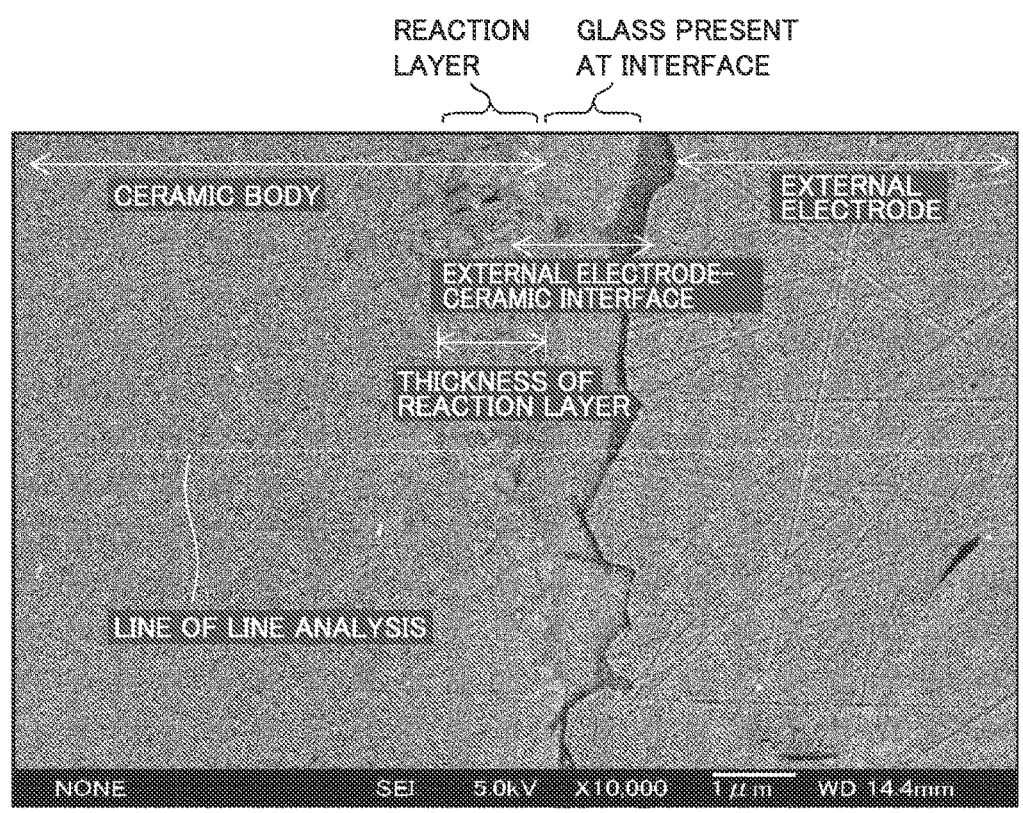
FIG. 3 shows a photomicrograph of a sample for describing a method for assessing the reactivity of the glass in an external electrode and a ceramic body, showing a reaction layer near a boundary of the external electrode and the ceramic body, a line of a line analysis, etc.

As shown in FIG. 3, it can be seen that a reaction layer is formed at an interface of the edge portion of the extending-around portion of the external electrode and the ceramic body.

Figure 4:
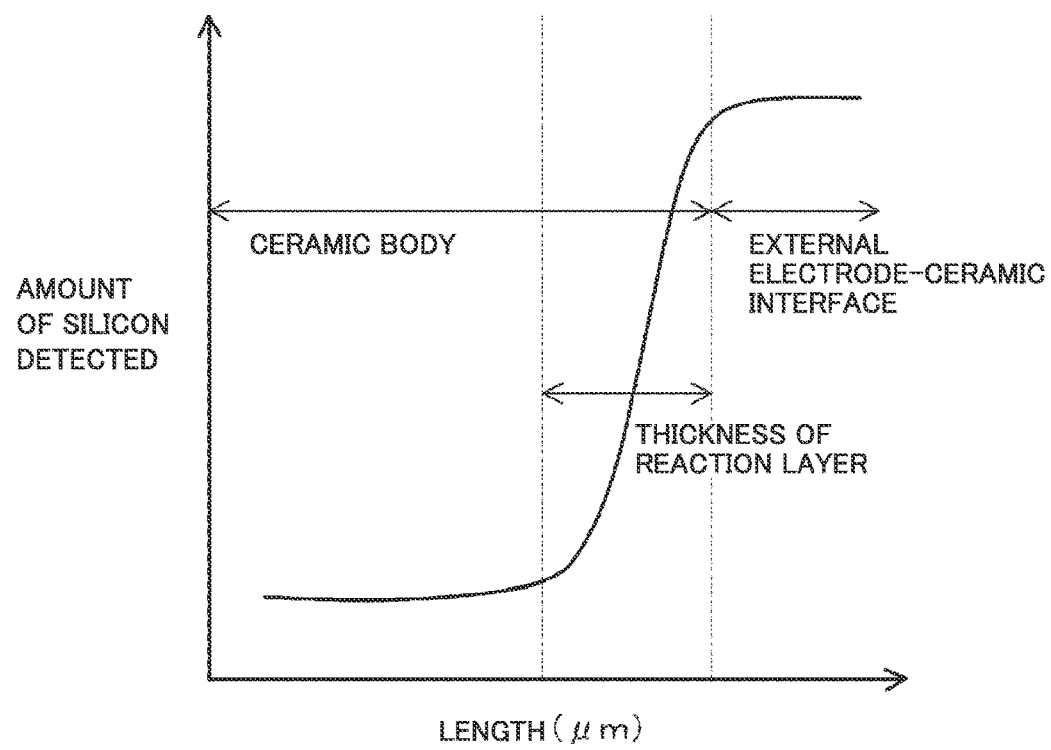
FIG. 4 shows a relationship between an amount of silicon (Si) detected by the line analysis and the thickness of the reaction layer.
Figure 5:
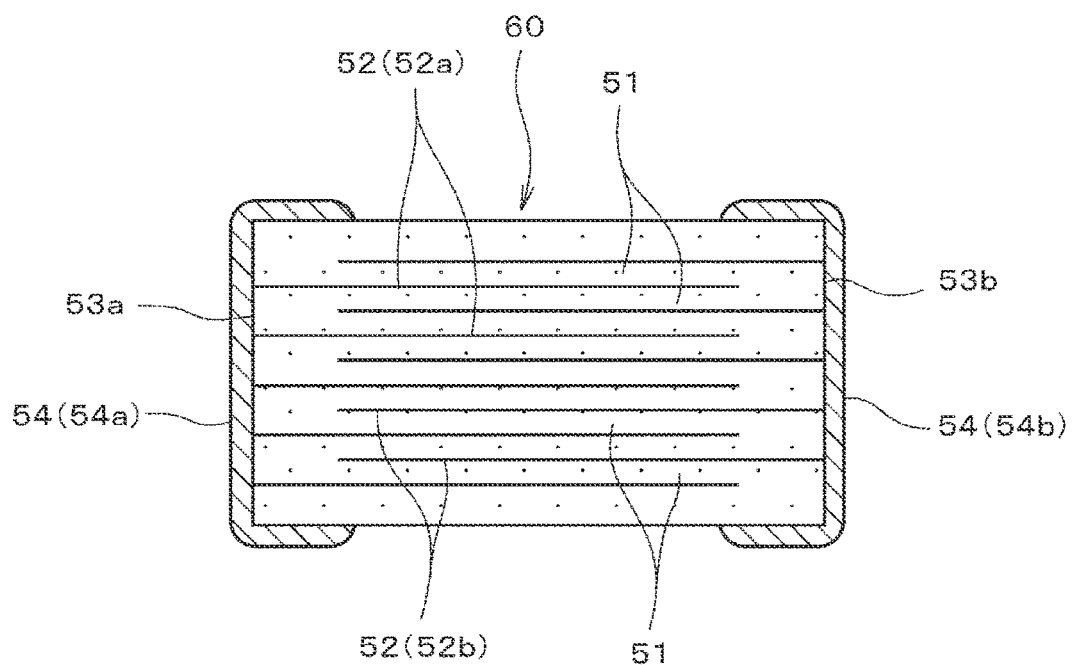
FIG. 5 shows an example of a conventional multilayer ceramic electronic component.

Furthermore, it can be seen from FIG. 4 that a region in which the amount of silicon (Si) detected rapidly increases (a region having a steep concentration gradient) corresponds to a region in which the reaction layer is formed (or is present).

(4) Measurement of Mechanical Strength (Transverse Test)

The multilayer ceramic capacitor fabricated as described above underwent a transverse test by 3-point bending. 20 samples (n=20) underwent the transverse test.

The transverse test was conducted under the following conditions:

(a) a pressing jig moved downward at a speed of: 0.1 [mm/sec]

(b) the pressing jig's radius (R) at a tip: 0.2 [mm]

(c) the pressing jig pressed against the sample at: the center of the ceramic body (d) Number of samples: n=20

As described above, the pressing jig having a tip with a radius of 0.2 mm was used to apply a load to the sample (the multilayer ceramic capacitor) at the center at a speed of 0.1 (mm/sec), and the load when the sample broke was measured as transverse strength.

Table 1 indicates the amounts of $SiO_2$, the first alkaline earth oxide BaO, and the second alkaline earth oxide (SrO and CaO) in the glass segregated at the interface of the edge region of the extending-around portion of the external electrode and the ceramic of the surface of the ceramic body in contact therewith, solubility relative to the plating liquid, reactivity with the ceramic body, and transverse strength as investigated by the transverse test.

TABLE 1

| | 1* | 2* | 3* | 4* | 5 | 6 | 7 | 8 | 9 | 10 | 11* | 12 | 13 | 14 | 15 | 16* |
|---|---|---|---|---|---|---|---|---|---|---|---|---|---|---|---|---|
| $SiO_2$ (mol %) | 10 | 15 | 10 | 15 | 15 | 15 | 15 | 60 | 60 | 60 | 70 | 15 | 15 | 15 | 15 | 15 |
| BaO (mol %) | 10 | 10 | 27 | 30 | 27 | 15 | 3 | 27 | 15 | 3 | 27 | 45 | 5 | 63 | 7 | 67.5 |
| RO (mol %) | 10 | 10 | 3 | 0 | 3 | 15 | 27 | 3 | 15 | 27 | 3 | 5 | 45 | 7 | 63 | 7.5 |
| content of SrO/CaO in RO (mol %) | 5/5 | 5/5 | 1.5/1.5 | — | 1.5/1.5 | 10/5 | 27/0 | 1.5/1.5 | 10/5 | 27/0 | 1.5/1.5 | 2.5/2.5 | 40/5 | 3.5/3.5 | 63/0 | 3.75/3.75 |
| BaO + RO (mol %) | 20 | 20 | 30 | 30 | 30 | 30 | 30 | 30 | 30 | 30 | 30 | 50 | 50 | 70 | 70 | 75 |
| (RO)/(BaO + RO) (molar ratio) | 0.5 | 0.5 | 0.1 | — | 0.1 | 0.5 | 0.9 | 0.1 | 0.5 | 0.9 | — | 0.1 | 0.9 | 0.1 | 0.9 | 0.1 |
| solubility relative to plating liquid | X | ○ | X | X crystallized | ○ | ○ | ○ | ○ | ○ | ○ | not vitrified | ○ | ○ | ○ | ○ | not vitrified |
| reactivity | X | X | ○ | ○ | ○ | ○ | ○ | ○ | ○ | ○ | | ○ | ○ | ○ | ○ | |
| transverse strength (N) | 28 | 32 | 30 | 18 | 43 | 44 | 40 | 55 | 56 | 53 | | 45 | 40 | 45 | 41 | |

Note that FIG. 3 is a photomicrograph of the ground surface with the reaction layer, a line of the line analysis, etc. indicated, and FIG. 4 shows a relationship between an Note that in table 1, samples 1-4, 11, and 16 are samples as comparative examples which do not satisfy the requirements of the present invention, and the other samples (samples 5-10, 12-15) are samples satisfying the requirements of the present invention.

Furthermore, in table 1, RO indicates the second alkaline earth oxide (i.e., a total content ratio of CaO and SrO). Note that while table 1 shows many samples containing more SrO in RO, CaO and SrO are both alkaline earth oxides having large ionic radii, and a case with more CaO contained in RO is also believed to have a similar effect.

Furthermore, in table 1, regarding "solubility relative to plating liquid," in the above assessment, any sample confirmed to have dissolution into the plating liquid was determined as being not good (indicated by a cross) and any sample that was not confirmed to have dissolution into the plating liquid was determined as being good (indicated by a circle).

Furthermore, in table 1, regarding "reactivity with ceramic," in the above assessment, any sample having a reaction layer with a thickness less than 0.5 μm was determined as being good (indicated by a circle), and any sample having a reaction layer with a thickness of 0.5 μm or larger was determined as being not good (indicated by a cross).

Sample 1, which did not satisfy the requirements for the present invention, had an amount of $SiO_2$ and an amount of the first alkaline earth oxide (BaO)+RO (the second alkaline earth oxide (at least one of CaO and SrO)) that are both lower than the present invention's ranges, and there was caused an intense reaction between the glass in the external electrode and the ceramic body and the glass segregated at the interface of the edge region of the extending-around portion of the external electrode and the ceramic configuring the surface of the ceramic body (i.e., at the interface of the external electrode's edge region and the ceramic body) was dissolvable into the plating liquid, and the sample was thus confirmed to have reduced transverse strength.

Sample 2, which did not satisfy the requirements for the present invention, had an amount of $SiO_2$ in the present invention's range and was thus less dissolvable in the plating liquid, however, the sample contained "BaO+RO" lower than present invention's range and there was caused an intense reaction between the glass in the external electrode and the ceramic body, and the sample was thus confirmed to have reduced transverse strength.

Sample 3, which did not satisfy the requirements for the present invention, contained "BaO+RO" in the present invention's range and thus presented a low reactivity between the glass in the external electrode and the ceramic body, however, the sample had an amount of $SiO_2$ lower than present invention's range and the glass segregated at the interface of the external electrode's edge region and the ceramic body was dissolvable in the plating liquid and the sample was thus confirmed to have reduced transverse strength.

Sample 4, which did not satisfy the requirements for the present invention, is a sample having an external electrode formed using a conductive paste containing glass that contained only the first alkaline earth oxide of BaO and did not contain any other alkaline earth oxide (i.e., the second alkaline earth oxide) and it was confirmed in the sample that a portion of the glass segregated at the interface of the external electrode's edge region and the ceramic body had been crystallized. And it has been confirmed that the partially crystallized glass resulted in the glass portion having a composition deviation resulting in the glass being dissolvable in the plating liquid, resulting in significantly reduced transverse strength.

Samples 5-7, which satisfied the requirements for the present invention, contained 15 mol % of $SiO_2$ and were confirmed to be less dissolvable in the plating liquid.

Sample 7 contained 30 mol % of "BaO+RO" and was confirmed to present low reactivity between the glass in the external electrode and the ceramic body. Furthermore, while sample 7, which had (RO)/(BaO+RO)=0.9, also obtained a satisfactory result for transverse strength, the sample was confirmed to have transverse strength somewhat smaller than sample 5 having (RO)/(BaO+RO)=0.1 and sample 6 having (RO)/(BaO+RO)=0.5.

Samples 8-10, which satisfied the requirements for the present invention, contained 60 mol % of $SiO_2$ and were confirmed to be less dissolvable in the plating liquid. Furthermore, the samples contained 30 mol % of "BaO+RO" and were confirmed to present low reactivity between the glass in the external electrode and the ceramic body.

Furthermore, while sample 10, which had (RO)/(BaO+RO)=0.9, also obtained a satisfactory result for transverse strength, the sample was confirmed to have transverse strength somewhat smaller than sample 8 having (RO)/(BaO+RO)=0.1 and sample 9 having (RO)/(BaO+RO)=0.5.

An amount of $SiO_2$ of 70 mol %, as presented by sample 11, which did not satisfy the requirements for the present invention, exceeds the vitrification range, and it was confirmed that there was no vitrification.

Samples 12 and 13, which satisfied the requirements for the present invention, contained 15 mol % of $SiO_2$ and were confirmed to be less dissolvable in the plating liquid. Furthermore, the samples contained 50 mol % of "BaO+RO" and were confirmed to present low reactivity between the glass in the external electrode and the ceramic body.

Furthermore, while sample 13, which had (RO)/(BaO+RO)=0.9, also obtained a satisfactory result for transverse strength, the sample was confirmed to have transverse strength somewhat smaller than sample 12 having (RO)/(BaO+RO)=0.1.

Samples 14 and 15, which satisfied the requirements for the present invention, contained 15 mol % of $SiO_2$ and were confirmed to be less dissolvable in the plating liquid. Furthermore, the samples contained 70 mol % of "BaO+RO" and were confirmed to present low reactivity between the glass in the external electrode and the ceramic body.

Furthermore, while sample 15, which had (RO)/(BaO+RO)=0.9, also obtained a satisfactory result for transverse strength, the sample was confirmed to have transverse strength somewhat smaller than sample 14 having (RO)/(BaO+RO)=0.1.

Sample 16, which contained 75 mol % of "BaO+RO" and thus did not satisfy the requirements for the present invention, contained "BaO+RO" exceeding the vitrification range and was thus confirmed to fail to provide vitrification.

Although samples 5-10, 12-15 indicated high transverse strength, it was confirmed that "RO/(BaO+RO)" having a value larger than 0.5 provided a tendency to decrease transverse strength. It is believed that this is because Sr and Ca, whose ions form a stronger electric field than Ba, were increased in amount, which resulted in a weakened Si—O bond and the glass was thus dissolvable, although slightly, in the plating liquid.

From the above result, it has been confirmed that by controlling a composition of glass present at an interface of an edge region of the external electrode that extends around to the side surface of the ceramic body and the ceramic of a surface of the ceramic body in contact therewith to be a composition containing 15 mol % or larger of $SiO_2$ and 30 mol % or larger of "BaO+RO" a highly reliable multilayer ceramic capacitor (multilayer ceramic electronic component) can be obtained that can enhance the glass' resistance in solubility against a plating liquid and also suppress the reactivity of the glass and the ceramic body and thus has satisfactory mechanical strength.

Furthermore, from the magnitude of the transverse strength of each sample, it has been confirmed that in order to ensure sufficient transverse strength, it is preferable to set the ratio of BaO and RO in a range of 0.1≤RO/(BaO+RO)≤0.5.

Note that while the above embodiment has been described with a multilayer ceramic capacitor referred to as an example, the present invention is not limited to the multilayer ceramic capacitor and is also applicable for example to a variety of multilayer ceramic electronic components such as a multilayer type LC composite component, a multilayer varistor and the like including an electrode (an internal electrode) in a ceramic body and an external electrode in such a manner extending from an end surface of the ceramic body around to a side surface thereof.

Furthermore, the present invention is not limited in other points to the above embodiment, either, and is capable of a variety of applications and modifications in the scope of the present invention.

REFERENCE SIGNS LIST

1: ceramic layer
2 (2a, 2b): internal electrode
3 (3a, 3b): end surface of ceramic body
4 (4a, 4b): external electrode
10: ceramic body
11: external electrode body
12: Ni plating film layer
13: Sn plating film layer
14: extending-around portion
14a: edge region of extending-around portion
15 (15a, 15b, 15c, 15d): four side surfaces of ceramic body

The invention claimed is:

1. A multilayer ceramic electronic component comprising:
a ceramic body having a structure in which a plurality of internal electrodes are stacked in layers with a ceramic layer interposed; and
an external electrode electrically connected to the internal electrodes, and formed at an end of the ceramic body and extending around from an end surface to a side surface of the ceramic body,
at an interface of an edge region of the external electrode that extends around to the side surface of the ceramic body and a ceramic of a surface of the ceramic body in contact therewith, a glass is present, the glass (a) containing BaO serving as a first alkaline earth oxide and SrO and optionally CaO serving as a second alkaline earth oxide, (b) having a total content ratio of the first alkaline earth oxide and the second alkaline earth oxide in a range of 30 to 70 mol %, and (c) having an $SiO_2$ content ratio in a range of 15 to 60 mol %, and
a molar ratio of the second alkaline earth oxide to a total of the first alkaline earth oxide and the second alkaline earth oxide [(the second alkaline earth oxide/(the first alkaline earth oxide+the second alkaline earth oxide)] is in a range of 0.1 to 0.5.

2. The multilayer ceramic electronic component according to claim 1, further comprising a plating film on the external electrode.

3. The multilayer ceramic electronic component according to claim 2, wherein the plating film is a Ni plating film.

4. The multilayer ceramic electronic component according to claim 3, further comprising a Sn plating film on the Ni plating film.

5. The multilayer ceramic electronic component according to claim 1, wherein the edge region is within 10 μm from an edge of the external electrode that extends around to the side surface of the ceramic body.

6. A conductive paste comprising:
an electrically conducting component;
a glass frit (a) containing BaO serving as a first alkaline earth oxide and SrO and optionally CaO serving as a second alkaline earth oxide, (b) having a total content ratio of the first alkaline earth oxide and the second alkaline earth oxide in a range of 30 to 70 mol %, and (c) having an $SiO_2$ content ratio in a range of 15 to 60 mol %;
a varnish; and
a solvent,
wherein a molar ratio of the second alkaline earth oxide to a total of the first alkaline earth oxide and the second alkaline earth oxide [(the second alkaline earth oxide/(the first alkaline earth oxide+the second alkaline earth oxide)] is in a range of 0.1 to 0.5.

7. The conductive paste according to claim 6, wherein the electrically conducting component is Cu powder.

8. The conductive paste according to claim 7, wherein the Cu powder has an average D50 particle diameter of 0.5 to 5 μm.

9. The conductive paste according to claim 6, wherein an amount of the glass frit is 18 to 22 vol % of a total of the electrically conducting component and the glass frit.

10. The conductive paste according to claim 6, wherein the varnish comprises acryl dissolved in an organic solvent containing terpineol as a major component thereof.

11. The conductive paste according to claim 6, wherein the solvent contains terpineol as a major component thereof.

* * * * *